United States Patent Office 2,728,742
Patented Dec. 27, 1955

2,728,742

IMPROVING QUALITY OF HYDROCARBON RESINS BY TREATMENT WITH DIVINYL COMPOUNDS

Fred W. Banes, Westfield, and Stanley B. Mirviss, Roselle, N. J., assignors to Esso Research and Engineering Company, a corporation of Delaware No Drawing. Application December 30, 1952, Serial No. 328,819

7 Claims. (Cl. 260—45.5)

This invention relates to a novel process for improving the quality of petroleum hydrocarbon resins and, more particularly, to a process in which petroleum resins are improved by the addition of limited amounts of divinyl substituted hydrocarbons, such as divinyl aromatic hydrocarbons, to the reaction mixture under critical conditions.

It is known that hydrocarbon resins can be produced from certain petroleum refinery streams containing olefins and diolefins by a variety of methods, such as polymerization using Friedel-Crafts catalysts. The steam cracked streams have been found especially useful for this purpose. The resins produced, from certain fractions, however, have softening points which are generally lower than desired for certain applications, such as, for example, in floor tile compositions. For use as the binding ingredient in commercial floor tile, for example, it is desirable that hydrocarbon resins have softening points of about 95–100° C. or greater so that the floor tiles made therefrom have the required indentation characteristics, flexibility, and impact resistance. Most of the resins that are produced from such hydrocarbon streams by Friedel-Crafts polymerization have softening points of 90° C. or lower.

It has now been found, however, that if a minor quantity of a hydrocarbon such as, illustrated by divinyl benzene, divinyl naphthalene, divinyl biphenyl, diisobutenyl benzene, diisopropenyl biphenyl, and the like, is added to the reaction mixture, improved resin yields are obtained and the resins obtained as products have higher softening points than are realized when the divinyl substituted hydrocarbons are not added to the reaction mixture. In order to achieve these improved effects it is necessary and critical that the divinyl substituted hydrocarbons be added to the reaction mixture after the major portion or all of the catalyst has been added. An additional reaction time of approximately 30 minutes or more is necessary in these cases although an elevated heating temperature is not required. If the divinyl benzene is added to the reaction mixture initially as part of the entire hydrocarbon feed, inferior yields and products are obtained.

It is not intended, however, that the scope of the invention be limited solely to the addition of divinyl benzene to the product reaction solution. An important effect is that realized by treating a product polymer to give increased resin hardness. It is obvious that the same result would be achieved by using the isolated resin or a solution thereof. In this case, the divinyl benzene-resin mixture requires heating to accelerate the reaction with the divinyl benzene.

Hydrocarbon resins to which the present invention is applicable are made by treating a hydrocarbon mixture containing diolefins, olefins, aromatics, paraffins, and naphthenes with 0.25 to 1.75% of an aluminum halide catalyst such as aluminum chloride and aluminum bromide. The catalysts may be used as solids or they may be employed as slurries in inert diluents or as hydrocarbon complexes such as are prepared by reacting aluminum chloride with raffinates stripped from resin polymerizates, for example, a naphtha containing about 60% olefins and 40% aromatics.

The polymerization feed should preferably be one from which the cyclodienes have been substantially removed. Typical hydrocarbon fractions useful for feeds in making these resins boil from 20° to 170° C. Analyses show the following composition:

| | Fraction, ° C. | Wt. Percent |
|---|---|---|
| Distillation | 20–70 | 0–60 |
| | 70–130 | 65–40 |
| | 130–170 | 35–0 |

| | Wt. percent |
|---|---|
| Diolefins | 8–20 |
| Aromatics | 19–49 |
| Olefins | 68–30 |
| Paraffins and naphthenes | 5–1 |

The polymerization reactions are conducted at temperatures in the range of −30 to +75° C. (preferably −10° to +60° C.). Residual catalyst is quenched by suitable methods, such as addition of methyl alcohol and subsequent filtration, or by addition of dilute acid, water and/or caustic washing. The final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils, heavy naphthas, or residua from petroleum. These cracked streams have wide boiling ranges between 20° and 170° C., or may be composed of any intermediate fraction selected from this range. The petroleum distillate resins synthesized by this method usually have softening points lower than 90° C.

The invention consists in adding to the reaction mixture after substantially all of the catalyst has been added, only minor quantities of a divinyl substituted hydrocarbon, preferably divinyl benzene. The quantity added to obtain the herein described improved properties of the resin, depends somewhat on the composition of the original polymerization feed stream and on the properties of the resin being treated. Generally, from 0.25 to 10% of divinyl benzene by from 0.5 to 7.5%, based on the naphtha in the reaction mixture, is added.

The polymerization to prepare the resin can be carried out either in batch or continuous operations with the divinyl compound being added after most of the polymerization has taken place.

The essential features of the invention are illustrated by the following examples although it is not intended to limit the invention thereto.

EXAMPLE 1

A steam cracked naphtha feed stream boiling in the range of 20° to 140° C., and containing about 14% diolefins, 36% aromatics, 1% paraffins and naphthenes, and 49% olefins was subjected to a series of experimental polymerizations. The reactions were carried out at about 20° C. About 1% of AlCl₃ was added as catalyst to the agitated reaction mixture, over a period of one-half hour. At the end of that time, the reaction mixture was contacted with 3% methyl alcohol, filtered through a bed of clay, and the product stripped to a bottoms temperature of 270° C. at 4 mm. Hg. The details of the data are shown in Table 1 below.

*Table I*

| Parts DVB [1] Added/ 100 Parts Naphtha | Time of DVB [1] Addition | Wt. Percent Resin | Wt. Percent Insoluble Polymer | Properties of Soluble Resin | | |
|---|---|---|---|---|---|---|
| | | | | Soft. Pt., °C.[2] | Color [3] | Iodine No.[4] |
| None | | 24.6 | None | 83 | 1 | 170 |
| 0.5 | Prior to AlCl₃ Add'n | 22.8 | 2-3 | 92 | 1 | 150 |
| 0.5 | After AlCl₃ Add'n | 27.1 | None | 92 | 1 | 150 |
| 1.3 | Prior to AlCl₃ Add'n | 21.6 | 4-5 | 102 | 1 | 165 |
| 1.3 | After AlCl₃ Add'n | 28.8 | None | 100 | 1 | 170 |

[1] DVB—Divinyl benzene.
[2] Ring and Ball Method (ASTM E-28-51-T).
[3] Color of a solution of 1 gm. of resin in 67 ml. of xylenes compared to Gardner color index.
[4] ASTM D-555-47.

These data show that even small concentrations of divinyl benzene, when added to the feed, result in undesirable gel formation. If, however, the divinyl benzene is added after the AlCl₃ catalyst is added, the resin yield and resin softening point are materially increased and no insoluble product is produced.

EXAMPLE 2

Another series of experiments was carried out using a cracked naphtha boiling predominantly in the range of 48° to 130° C. and containing about 8% diolefins, 29% aromatics, 2% paraffins and naphthenes, and 61% olefins. About 1% of powdered AlCl₃ was added to the stirred reaction mixture at a temperature of 25° C. over a 30 minute period. The reaction mixture was agitated for another 30 minutes at 45° C., then washed with 5% H₂SO₄ solution, and finally washed with water. The resin was recovered by stripping to a bottoms temperature of 270° C. at 3 mm. Hg.

Details are shown in Table II below.

*Table II*

| Parts DVB [1]/100 Parts Naphtha Added to Reaction Mixture After AlCl₃ Addition | Wt. Percent Resin | Wt. Percent Insoluble Polymer (Gel) | Resin Properties | | |
|---|---|---|---|---|---|
| | | | Soft. Point, °C. | Color | Iodine Number |
| None | 20.0 | None | 80 | 4 | 232 |
| 1.3 | 22.3 | None | 90 | 3 | 196 |
| 3.2 | 28.1 | None | 96 | 3 | 175 |
| 5.0 | 31.0 | None | 121 | 4 | 150 |

[1] DVB—Divinyl benzene.

These data show that the addition of small quantities of divinyl benzene to a relatively poor feed results in a sizeable improvement in resin yield and resin softening point without encountering gel formation.

EXAMPLE 3

In another set of experiments, the naphtha used boiled in the range of 35° to 145° C. and contained 16.2% diolefins, 30.2% aromatics, 3% paraffins and naphthenes, and 50.6% olefins. The polymerization temperatures and amount of catalysts were varied as shown in the data of Table III. The polymerization reaction product was quenched with aqueous H₂SO₄, water washed and then steam stripped at 250° C. to give hard resins. In each experiment, 3.2% of divinyl benzene, based on the naphtha, was added after the catalyst addition except the control to which no divinyl benzene was added. The naphtha was first polymerized by the addition of catalyst over a 30–45 minute period. After the catalyst addition, the divinyl benzene was added and the reaction mixture was agitated at the same temperature for an additional period of 30–45 minutes.

*Table III*

| Reaction Temperature | Wt. Percent AlCl₃ | Yield, Wt. Percent | | Resin Properties | |
|---|---|---|---|---|---|
| | | Resin | Gel | Soft. Pt., °C. | Color |
| 20–25° C | 0.5 | 38.7 | None | 104.5 | 1 |
| 20–25° C | 1.0 | 41.4 | None | 101.5 | 2 |
| 20–25° C | 1.5 | 42.0 | None | 103.0 | 2 |
| 20–25 °C | 2.0 | 35.6 | 5.0 | 96.0 | 2 |
| 0° C | 1.0 | 40.0 | None | 104.0 | 2 |
| 55° C | 1.0 | 41.2 | None | 107.0 | 4 |
| Control 20–25° C | 1.0 | 35.0 | None | 90.0 | 3 |

The above data show that high yields of high softening point, soluble resins can be prepared at catalyst concentrations of 0.5 to at least 1.5 but less than 2% and at temperatures of 0 to 55° C. (or even a wider range). For comparison, the naphtha without divinyl benzene (1% AlCl₃, 20–25° C.) gave a 35% yield of 90° C. softening point resin.

EXAMPLE 4

The naphtha described in Example 3 was used in another series of experiments in which AlBr₃ was used as the catalyst. In one case, 3.2% divinyl benzene was added to the naphtha prior to the addition of 1% solid AlBr₃. The run was carried out at 25° C. and resin was isolated using the procedure outlined in the previous examples. A 39% yield of 108° C. softening point resin was recovered and insoluble product separated from the reaction solution. In contrast, when the same amount of divinyl benzene was added after catalyst addition, the resinous product was completely soluble. The final yield of soluble resin was 39.6% based on the feed and the resin had a softening point of 113° C.

EXAMPLE 5

A resin prepared from a naphtha as in Example 1 and having a softening point of 75° C. was reacted with divinyl benzene in a bomb for 5 hours at 280° C. The reaction mixture was stripped for 3 hours at 240° C. with nitrogen being used to remove any volatile products. The results given below in Table IV show that the resins can thus be modified to produce higher softening point soluble products of a type which are useful in floor tile applications and the like.

*Table IV*

| Percent Divinyl Benzene on Resin | Final Resin, Soft. Pt., °C. | Insoluble Product |
|---|---|---|
| 2.0 | 93 | None |
| 5.0 | 105 | None |
| None | 91 | None |

EXAMPLE 6

A naphtha stream boiling largely in the range of 70 to 170° C. (10% below 70° C.) and containing about 15% diolefins, 40% aromatics and 45% olefins was polymerized with 1% AlCl₃ at 25° C. and gave a 16.2% yield of a resin having a softening point of 80° C. This naphtha was subject to a large improvement with respect to resin yield and softening point by the addition of 3% divinyl benzene to the reaction mixture after completion of the catalyst addition. On the other hand, a naphtha of similar composition but boiling in the range of 170 to 260° C. gave a 25.5% yield of 110° C. softening point resin when treated with 1% AlCl₃ at 25° C. The resin yield and softening point in this case are at desirably high levels and do not require the addition of divinyl benzene to produce usable products.

What is claimed is:

1. A process for raising the softening point of an unsaturated hydrocarbon resin obtained by heating a steam cracked petroleum distillate boiling in the range of about 20° to 170° C. in the presence of 0.25 to 1.75% of an aluminum halide catalyst at a temperature of —30° C. to +75° C., which consists in adding from 0.25 to 10% of a hydrocarbon chosen from the group consisting of divinyl benzene, divinyl naphthalene, divinyl biphenyl, diisobutenyl benzene and diisopropenyl biphenyl to said polymerized resin after addition of the catalyst is substantially completed.

2. An improved petroleum resin prepared by the process of claim 1.

3. A process for producing soluble resinous products having increased softening points obtained by treating a steam cracked petroleum distillate fraction boiling in the range of 20° C. to 140° C. with from 0.5 to 1.5% of an aluminum halide catalyst at a temperature in the range of —30° C. to +75° C. which consists in adding from 0.25 to 10% of a hydrocarbon chosen from the group consisting of divinyl benzene, divinyl naphthalene, divinyl biphenyl, diisobutenyl benzene and diisopropenyl biphenyl to the reaction mixture after addition of the catalyst is substantially complete.

4. A process for raising the softening point of an unsaturated hydrocarbon resin obtained by treating a steam cracked petroleum distillate boiling in the range of about 20° to 170° C. in the presence of 0.25 to 1.75% of an aluminum halide catalyst at a temperature of —30° to +75° C., which consists in adding from 0.25 to 10% of divinyl benzene to a solution of said resin after addition of the catalyst is substantially completed.

5. A process for raising the softening point of an unsaturated hydrocarbon resin obtained by treating a steam cracked petroleum distillate boiling in the range of about 20° to 170° C., in the presence of 0.5 to 1.5% of an aluminum halide catalyst at a temperature of —10° to +60° C., which consists in after treating the resin with from 0.5% up to 7.5% of divinyl benzene.

6. An improved petroleum resin prepared by the process of claim 5.

7. A process for raising the softening point of an unsaturated hydrocarbon resin which consists in polymerizing a steam cracked petroleum fraction boiling from 20° up to 170° C. and containing from 8 to 20 weight percent diolefins, from 19 to 49 weight percent aromatics, from 68 to 30 weight percent olefins, and from 5 to 1 weight percent paraffins and naphthenes, with from 0.5 to 1.5% of an aluminum halide catalyst at a temperature in the range of —10° to +60° C. and adding from 0.25 to 7.5% of divinyl benzene to the reaction mixture after addition of the catalyst is substantially complete.

References Cited in the file of this patent
UNITED STATES PATENTS

| | | |
|---|---|---|
| 2,418,978 | Mertens | Apr. 15, 1947 |
| 2,474,807 | Schoene | July 5, 1949 |